United States Patent
Shibata et al.

(10) Patent No.: US 10,628,374 B2
(45) Date of Patent: Apr. 21, 2020

(54) ELECTRONIC APPARATUS, IMAGE FORMING APPARATUS, AND CONTROL METHOD AND PROGRAM THEREFOR

(71) Applicant: RICOH COMPANY, LTD., Tokyo (JP)

(72) Inventors: Takayuki Shibata, Kanagawa (JP); Toshihiro Hamano, Tokyo (JP); Tatsuya Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 185 days.

(21) Appl. No.: 15/831,529

(22) Filed: Dec. 5, 2017

(65) Prior Publication Data

US 2018/0157617 A1 Jun. 7, 2018

(30) Foreign Application Priority Data

Dec. 6, 2016 (JP) .................. 2016-237036

(51) Int. Cl.
*G06F 11/00* (2006.01)
*G06F 15/177* (2006.01)
*G06F 13/12* (2006.01)
*G06F 15/163* (2006.01)
*G06F 1/24* (2006.01)

(52) U.S. Cl.
CPC .............. *G06F 15/177* (2013.01); *G06F 1/24* (2013.01); *G06F 13/126* (2013.01); *G06F 15/163* (2013.01); *G05B 2219/2231* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,936,452 A | * | 8/1999 | Utsuno | G06F 1/24 327/142 |
| 6,877,112 B1 | * | 4/2005 | Iino | G06F 11/3652 703/23 |
| 2002/0046356 A1 | * | 4/2002 | Okabayashi | G11C 7/22 713/501 |
| 2004/0243878 A1 | * | 12/2004 | Kondo | G06F 1/06 713/600 |

FOREIGN PATENT DOCUMENTS

JP 2009-003862 1/2009
JP 2014-209276 11/2014

* cited by examiner

*Primary Examiner* — Charles Ehne
(74) *Attorney, Agent, or Firm* — Xsensus LLP

(57) ABSTRACT

An electronic apparatus includes a first processor and a second processor. The first processor includes a detection unit to detect output of an internal-reset occurrence signal from the second processor, and an identification unit to identify, as a source of the internal reset, the second processor in response to the internal-reset occurrence signal and an input of an identification signal from the second processor. The second processor includes an internal reset unit to internally reset the second processor in response to a malfunction of the second processor, a reset occurrence signal output unit to output the internal-reset occurrence signal in response to occurrence of the internal reset of the second processor, and an identification signal output unit to output, to the first processor, the identification signal indicating the source of the internal reset, in response to the occurrence of the internal reset of the second processor.

14 Claims, 14 Drawing Sheets

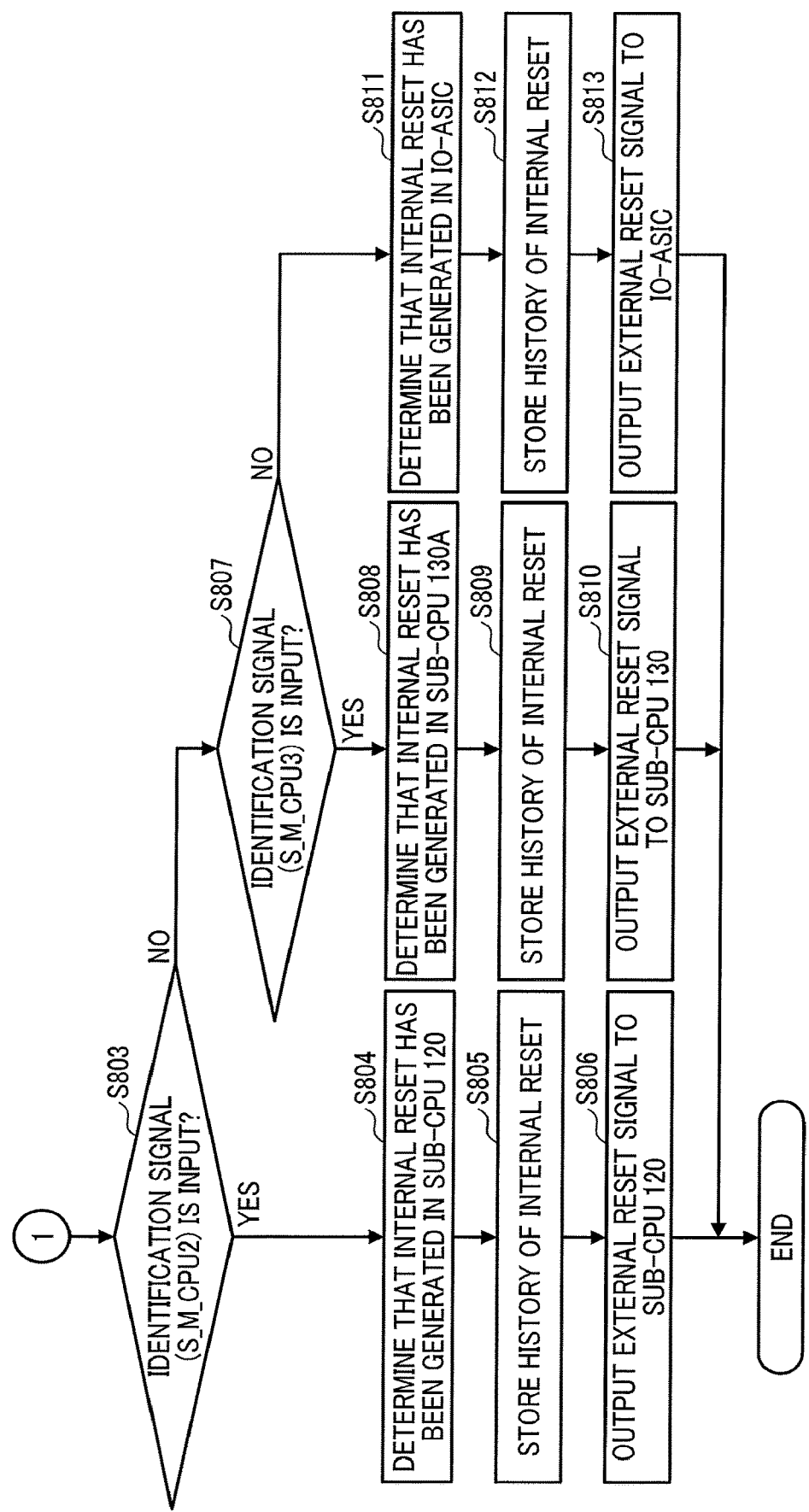

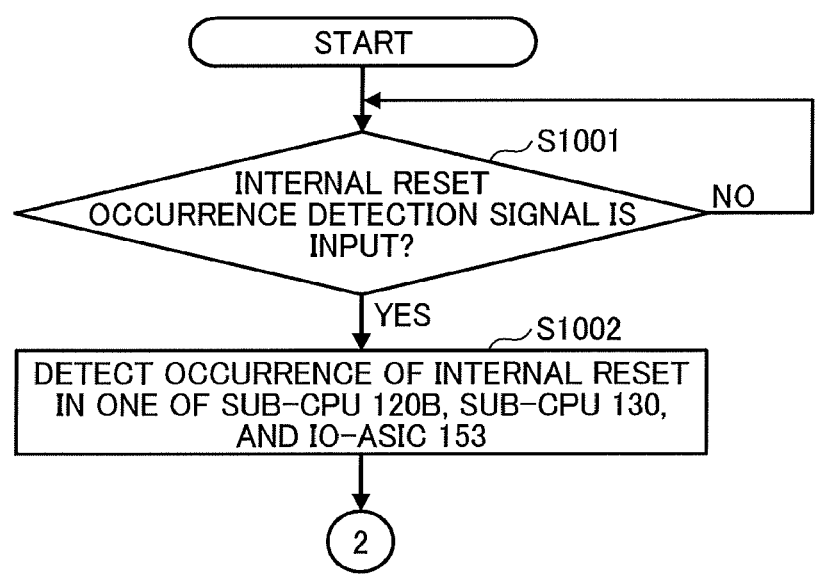

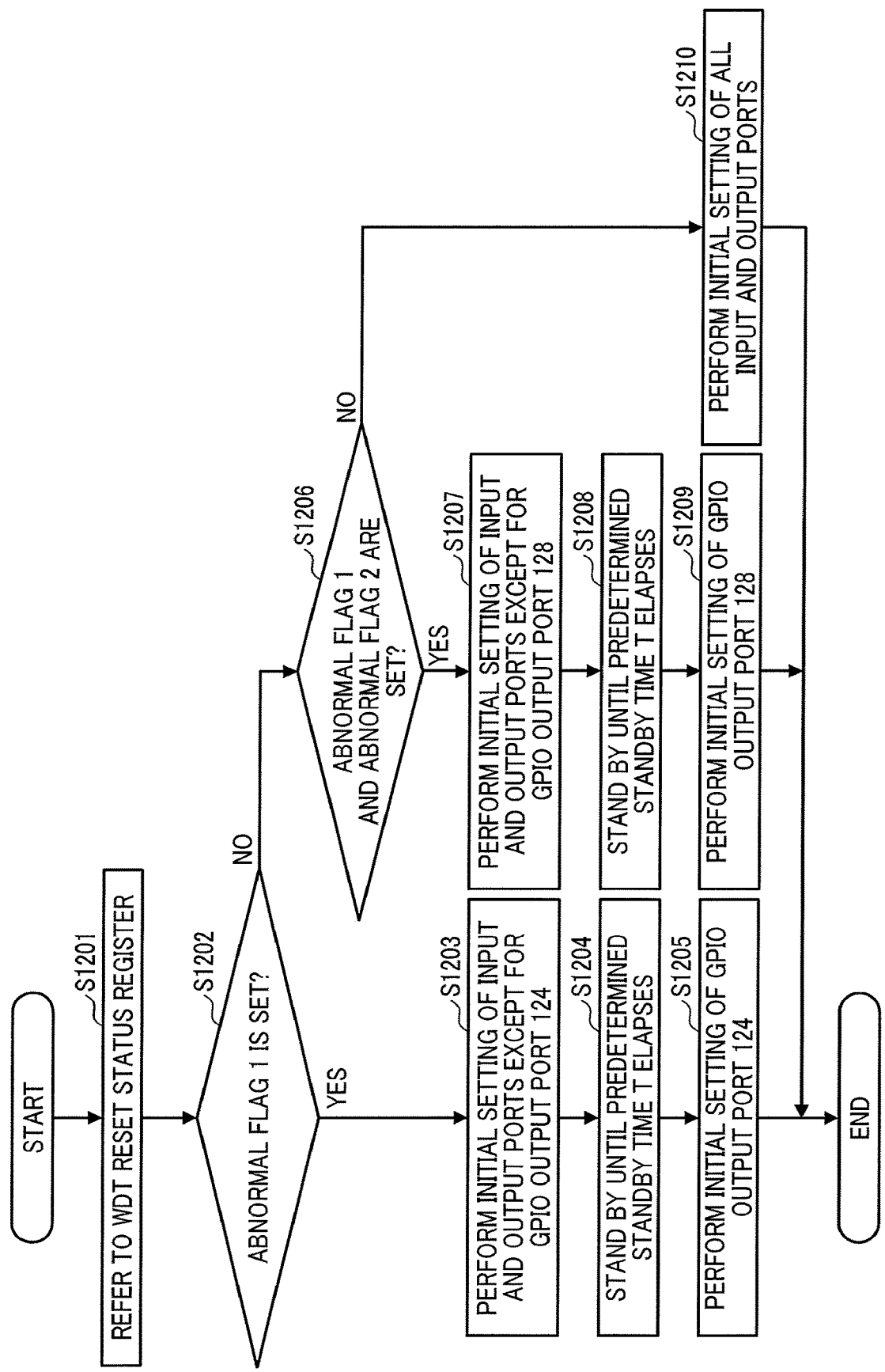

ELECTRONIC APPARATUS, IMAGE FORMING APPARATUS, AND CONTROL METHOD AND PROGRAM THEREFOR

CROSS-REFERENCE TO RELATED APPLICATIONS

This patent application is based on and claims priority pursuant to 35 U.S.C. § 119(a) to Japanese Patent Application No. 2016-237036, filed on Dec. 6, 2016, in the Japan Patent Office, the entire disclosure of which is hereby incorporated by reference herein.

BACKGROUND

Technical Field

This disclosure relates to an electronic apparatus, an image forming apparatus, a control method, and a computer program product storing the method.

Description of the Related Art

There are electronic devices that include a plurality of processors and are capable of causing the plurality of processors to share and execute a plurality of functions. For example, there are multi-component systems in which central processing units (CPUs) are respectively provided for a plurality of components such as a local area network (LAN), a serial, and a compact flash (registered trademark) or CF. Further, regarding such a system, it is known that a CPU operating normally resets another CPU being in an abnormal state at a timing at which such resetting would not cause a problem.

Some electronic devices include a main CPU to control the entire electronic device and a plurality of sub-CPUs to control a part of the electronic device (for example, a motor). Further, in some cases, in the electronic device configured as described above, each of the plurality of sub-CPUs includes a watch dog timer (WDT) to enable self reset (internal reset) in the sub-CPU at the occurrence of abnormality.

SUMMARY

An embodiment of this disclosure provides an electronic apparatus including a plurality of processors including a first processor and at least one second processor. The second processor includes an internal reset unit configured to perform internal reset of the second processor in response to an occurrence of a malfunction of the second processor, a reset occurrence signal output unit configured to output an internal-reset occurrence signal in response to the internal reset of the second processor, and an identification signal output unit configured to output, to the first processor, an identification signal indicating a source of the internal reset, in response to the occurrence of the internal reset of the second processor. The internal-reset occurrence signal indicates that an internal reset has occurred. The first processor includes a detection unit configured to detect an output of the internal-reset occurrence signal from the second processor and an identification unit. In a case where the detection unit detects the occurrence of the internal reset and the identification signal is input to the first processor from the second processor, the identification unit is configured to identify the second processor as the source of the internal reset.

Another embodiment provides a method performed by a processor of an electronic apparatus including a plurality of processors. The method includes detecting an output of an internal-reset occurrence signal indicating that an internal reset has occurred in another one of the plurality of processors, and, in a case where the internal-reset occurrence signal is output and an identification signal is input from that processor, identifying, that processor as a source of the internal reset.

Another embodiment provides a non-transitory recording medium storing a plurality of instructions which, when executed by a processor, cause the processor to execute the following method. The method includes detecting an output of an internal-reset occurrence signal indicating that an internal reset has occurred in one of a plurality of processors, and identifying, as a source of the internal reset, the one of the plurality of processors in response to the output of the internal-reset occurrence signal and an input of an identification signal from the one of the plurality of processors.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 8A and 8B are flowcharts illustrating a procedure of processes performed in the main CPU of an image forming apparatus according to Embodiment 2;

FIGS. 10A and 10B are flowcharts illustrating a procedure of processes performed in a main CPU of an image forming apparatus according to Embodiment 3;

FIG. 12 is a flowchart illustrating a procedure of initialization processing performed by an initialization processing unit in the image forming apparatus according to Embodiment 3.

Figure 1:
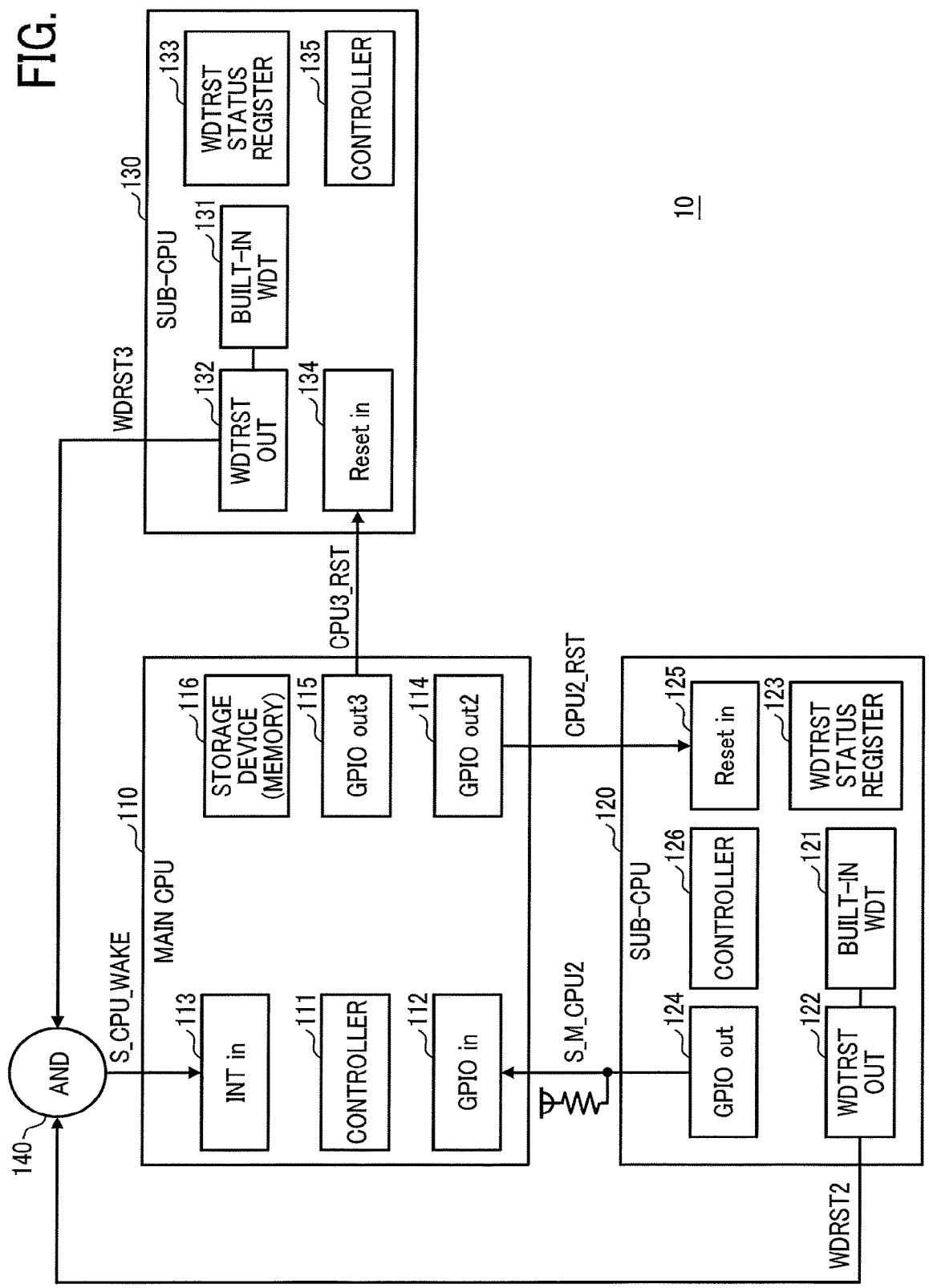
FIG. 1 is a schematic view of an image forming apparatus according to Embodiment 1.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity.

However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an image forming apparatus according to an embodiment of this disclosure is described. As used herein, the singular forms "a", "an", and "the" are intended to include the plural forms as well, unless the context clearly indicates otherwise.

Embodiment 1

Embodiment 1 is described below with reference to FIG. 1. Embodiment 1 concerns an example in which a sub-CPU 120 and a sub-CPU 130 are connected to a main CPU 110 and the main CPU 110 detects an occurrence of an internal reset in the sub-CPU 120 or sub-CPU 130.

Configuration of Image Forming Apparatus

FIG. 1 is a schematic view of an image forming apparatus 10 according to Embodiment 1. The image forming apparatus 10 illustrated in FIG. 1 is an example of an electronic device and an image forming apparatus according to aspects of this disclosure. The image forming apparatus 10 is, for example, a multifunction printer, a multifunction peripheral (MFP), a laser printer, an inkjet printer, or a scanner but is not limited to those devices.

As illustrated in FIG. 1, the image forming apparatus 10 in the present embodiment includes the main CPU 110, the sub-CPU 120, the sub-CPU 130, and an AND circuit 140. The main CPU 110 is an example of a first processor. The sub-CPU 120 is an example of a second processor. The sub-CPU 130 is an example of a third processor. The AND circuit 140 is an example of a logic circuit. For example, in the image forming apparatus 10, the main CPU 110 can control the entire image forming apparatus 10 and the sub-CPU 120 and the sub-CPU 130 can control a part (for example, a motor or a sensor) of the image forming apparatus 10.

Main CPU

In the example illustrated in FIG. 1, the main CPU 110 includes a controller 111, a general-purpose input/output (GPIO) input port 112, an interrupt port 113, a GPIO output port 114, a GPIO output port 115, and a storage device 116.

The controller 111 executes programs stored in the main CPU 110 to perform various kinds of processing in the main CPU 110. For example, in a case where an internal reset has occurred in one of the processors, the controller 111 identifies a processor in which the internal reset has occurred or outputs an external reset signal to the processor in which the internal reset has occurred.

The GPIO input port 112 is a terminal to which an identification signal S_M_CPU2 output from the sub-CPU 120 is input.

The interrupt port 113 is a terminal to which an external interrupt signal is input. A detection signal S_CPU_WAKE output from the AND circuit 140 is input to the interrupt port 113.

The GPIO output port 114 is a terminal to output, to the sub-CPU 120, an external reset signal CPU2_RST for resetting the sub-CPU 120, in a case where the controller 111 has determined that an internal reset has occurred in the sub-CPU 120.

The GPIO output port 115 is a terminal to output, to the sub-CPU 130, an external reset signal CPU3_RST for resetting the sub-CPU 130, in a case where the controller 111 has determined that an internal reset has occurred in the sub-CPU 130.

The storage device 116 is a memory that, in a case where the sub-CPU 120 or sub-CPU 130 is internally reset, stores a history of occurrence of the internal reset.

Sub-CPU

In the example illustrated in FIG. 1, the sub-CPU 120 includes a built-in WDT 121, a WDTRST output terminal 122, a WDT reset status register 123, a GPIO output port 124, an external reset terminal input 125, and a controller 126.

The built-in WDT 121 internally resets the sub-CPU 120 in a case of malfunction of the sub-CPU 120 (for example, a malfunction in processing according to programs).

The WDTRST output terminal 122 is a terminal to output a WDT reset occurrence pulse WDRST2 (example of "internal-reset occurrence signal"). The WDT reset occurrence pulse WDRST2 normally has a value "1". The value of the WDT reset occurrence pulse WDRST2 becomes "0" when the built-in WDT 121 internally resets the sub-CPU 120. This indicates the occurrence of an internal reset in the sub-CPU 120.

In a case where the built-in WDT 121 internally resets the sub-CPU 120, the WDT reset status register 123 stores the history of occurrence of the reset. With such a history of occurrence, after the reset of the sub-CPU 120, the sub-CPU 120 can determined whether the sub-CPU 120 has been reset by the built-in WDT 121 or by another factor.

The GPIO output port 124 is a terminal to output an identification signal S_M_CPU2 (example of "identification signal"). The identification signal S_M_CPU2 normally has a value "0". When the built-in WDT 121 internally resets the sub-CPU 120, the value of the identification signal S_M_CPU2 becomes "1" due to an action of a pull-up resistor disposed in the sub-CPU 120. This indicates that the sub-CPU 120 is the source (device or processor) where the internal reset has occurred (i.e., the source of occurrence of internal reset).

The external reset terminal input 125 is a terminal to which an external reset signal CPU2_RST output from the main CPU 110 is input.

The controller 126 executes programs stored in the sub-CPU 120 to perform various kinds of processing in the sub-CPU 120. For example, the controller 126 controls output of various kinds of signals (for example, the WDT reset occurrence pulse WDRST2 and the identification signal S_M_CPU2) and resets the sub-CPU 120 in response to the external reset signal from the main CPU 110.

Another Sub-CPU

In the example illustrated in FIG. 1, the sub-CPU 130 includes a built-in WDT 131, a WDTRST output terminal 132, a WDT reset status register 133, an external reset terminal input 134, and a controller 135.

The built-in WDT 131 internally resets the sub-CPU 130 in a case of malfunction of the sub-CPU 130 (for example, a malfunction in processing according to programs).

The WDTRST output terminal 132 is a terminal to output a WDT reset occurrence pulse WDRST3 (example of "internal-reset occurrence signal"). The WDT reset occurrence pulse WDRST3 normally has a value "1". The value of the WDT reset occurrence pulse WDRST3 becomes "0" when the built-in WDT 131 internally resets the sub-CPU 130. This indicates the occurrence of an internal reset in the sub-CPU 130.

In a case where the built-in WDT 131 resets the sub-CPU 130, the WDT reset status register 133 stores a history of occurrence of the reset. With such a history of occurrence, after the reset of the sub-CPU 130, the sub-CPU 130 can determine whether the sub-CPU 130 has been reset by the built-in WDT 131 or by another factor.

The external reset terminal input 134 is a terminal to which an external reset signal CPU3_RST output from the main CPU 110 is input.

The controller 135 executes programs stored in the sub-CPU 130 to perform various kinds of processing in the sub-CPU 130. For example, the controller 135 controls output of various kinds of signals (for example, the WDT reset occurrence pulse WDRST3) and resets the sub-CPU 130 in response to the external reset signal from the main CPU 110.

AND Circuit

The AND circuit 140 performs logical operation (AND operation) of the WDT reset occurrence pulse WDRST2 output from the sub-CPU 120 and the WDT reset occurrence pulse WDRST3 output from the sub-CPU 130. With this, the AND circuit 140 generates the detection signal S_CPU_WAKE (example of "internal-reset occurrence detection signal") and outputs the detection signal S_CPU_WAKE. The detection signal S_CPU_WAKE indicates, with a logical value, whether or not an internal reset has occurred in another processor. Specifically, a value of the detection signal S_CPU_WAKE becomes "0" when an internal reset has occurred in the sub-CPU 120 or sub-CPU 130. With this, the detection signal S_CPU_WAKE indicates that an internal reset has occurred in the sub-CPU 120 or sub-CPU 130.

Normally, the values of both the value of the WDT reset occurrence pulse WDRST2 and the value of the WDT reset occurrence pulse WDRST3 are "1". Therefore, the value of the detection signal S_CPU_WAKE becomes "1".

Meanwhile, in a case where an internal reset has occurred in the sub-CPU 120 or sub-CPU 130, the value of the WDT reset occurrence pulse WDRST2 or the value of the WDT reset occurrence pulse WDRST3 becomes "0". Therefore, the value of the detection signal S_CPU_WAKE becomes "0".

Therefore, when the value of the detection signal S_CPU_WAKE input through the single interrupt port 113 becomes "0", the main CPU 110 can detect the occurrence of an internal reset in the sub-CPU 120 or sub-CPU 130.

A functional configuration of the image forming apparatus 10 is described below.

Figure 2:
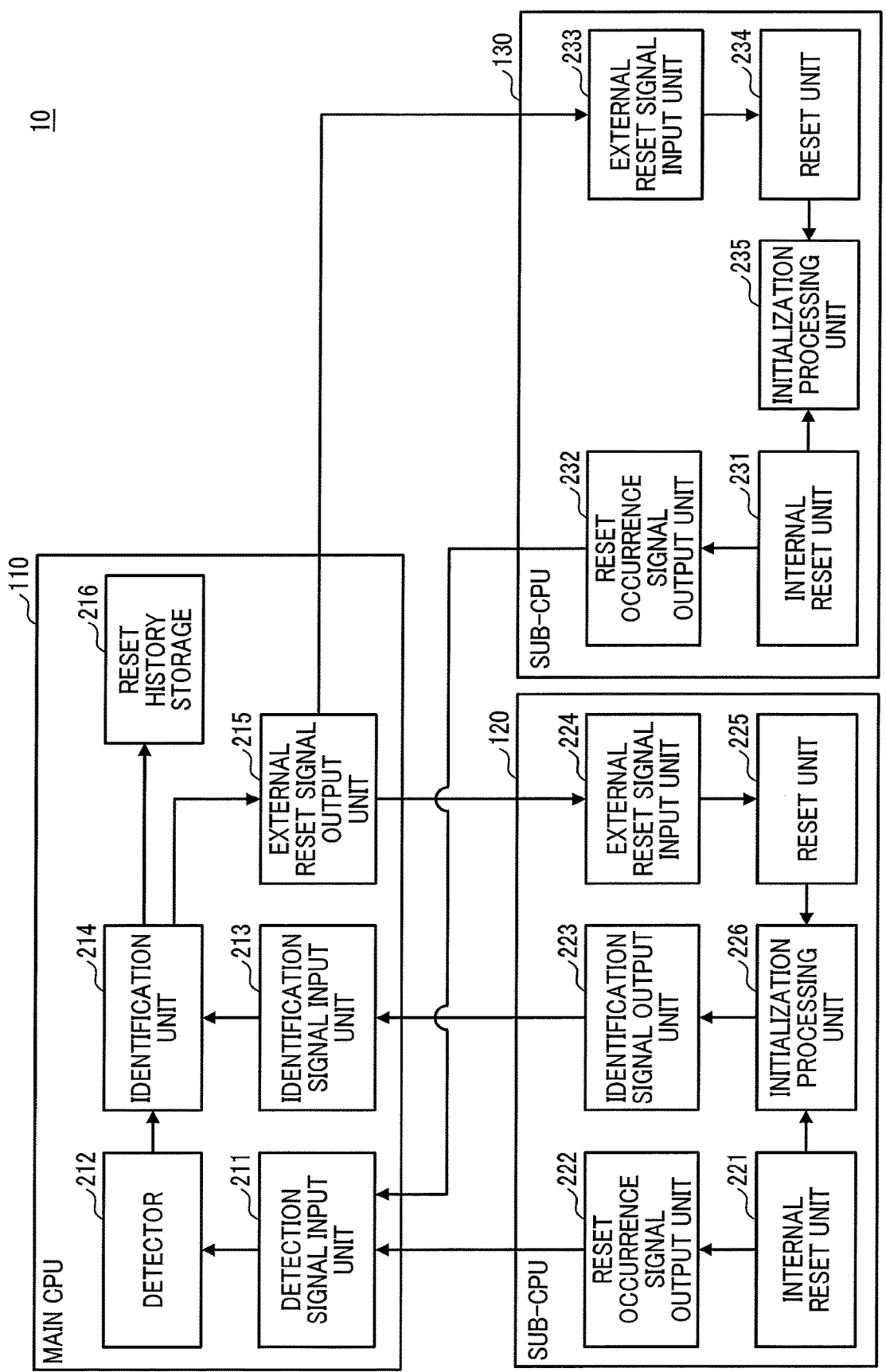
FIG. 2 is a schematic block diagram of a functional configuration of the image forming apparatus according to Embodiment 1.

FIG. 2 is a schematic block diagram of the functional configuration of the image forming apparatus 10 according to Embodiment 1.

Main CPU

In the example illustrated in FIG. 2, the main CPU 110 includes a detection signal input unit 211, a detector 212 (i.e., a detection unit), an identification signal input unit 213, an identification unit 214, an external reset signal output unit 215, and a reset history storage 216.

In response to an output of an internal-reset occurrence signal from one of the sub-CPU 120 and the sub-CPU 130, the detection signal input unit 211 accepts input of an internal-reset occurrence detection signal output from the AND circuit 140. In the present embodiment, the detection signal input unit 211 is implemented by the interrupt port 113 (see FIG. 1) of the main CPU 110. That is, the detection signal input unit 211 accepts input of the detection signal S_CPU_WAKE (value="0") output from the AND circuit 140 as the internal-reset occurrence detection signal.

In a case where the detection signal input unit 211 accepts input of the internal-reset occurrence detection signal, the detector 212 detects the occurrence of an internal reset in the sub-CPU 120 or sub-CPU 130. In the present embodiment, when the internal-reset occurrence signal is output from one of the sub-CPU 120 and the sub-CPU 130, the detection signal S_CPU_WAKE having a value of "0" is input to the main CPU 110. Therefore, when the detection signal input unit 211 accepts input of the detection signal S_CPU_WAKE having a value of "0", the detector 212 detects the occurrence of the internal reset in the sub-CPU 120 or sub-CPU 130. In the present embodiment, the detector 212 is implemented by the controller 111 (see FIG. 1) of the main CPU 110.

The identification signal input unit 213 accepts input of an identification signal output from the sub-CPU 120 in a case where the sub-CPU 120 is internally reset. The identification signal indicates that the sub-CPU 120 is the source where an internal reset has occurred. In the present embodiment, the identification signal input unit 213 is implemented by the GPIO input port 112 (see FIG. 1) of the main CPU 110. That is, the identification signal input unit 213 accepts input of an identification signal S_M_CPU2 (value="1") as the identification signal.

In a case where the detector 212 detects the occurrence of an internal reset and the identification signal input unit 213 accepts input of the identification signal, the identification unit 214 identifies the sub-CPU 120 as the processor where an internal reset has occurred (source processor). Meanwhile, in a case where the detector 212 detects the occurrence of an internal reset and the identification signal input unit 213 does not accept input of the identification signal, the identification unit 214 identifies the sub-CPU 130 as the processor where an internal reset has occurred. In the present embodiment, the identification unit 214 is implemented by the controller 111 (see FIG. 1) of the main CPU 110.

The external reset signal output unit 215 outputs an external reset signal to the processor that is the processor where an internal reset has occurred, identified by the identification unit 214. That is, in a case where the sub-CPU 120 is identified as the processor where an internal reset has occurred, the external reset signal output unit 215 outputs an external reset signal to the sub-CPU 120. By contrast, in a case where the sub-CPU 130 is identified as the processor where an internal reset has occurred, the external reset signal output unit 215 outputs an external reset signal to the sub-CPU 130. In the present embodiment, the external reset signal output unit 215 is implemented by the GPIO output ports 114 and 115 (see FIG. 1) of the main CPU 110. That is, the external reset signal output unit 215 transmits an external reset signal CPU2_RST to the sub-CPU 120 and transmits an external reset signal CPU3_RST to the sub-CPU 130.

When the identification unit 214 identifies the source where an internal reset has occurred, the reset history storage 216 stores a history of occurrence of the internal reset in a format in which the source where an internal reset has occurred is identifiable. In the present embodiment, the reset history storage 216 is implemented by the storage device 116 (see FIG. 1) of the main CPU 110.

Sub-CPU

In the example illustrated in FIG. 2, the sub-CPU 120 includes an internal reset unit 221, a reset occurrence signal output unit 222 (i.e., a reset occurrence signal output unit), an identification signal output unit 223, an external reset signal input unit 224, a reset unit 225, and an initialization processing unit 226.

When the sub-CPU 120 malfunctions, the internal reset unit 221 internally resets the sub-CPU 120. In the present embodiment, the internal reset unit 221 is implemented by the built-in WDT 121 (see FIG. 1) of the sub-CPU 120.

In response to the internal reset of the sub-CPU 120, the reset occurrence signal output unit 222 outputs an internal-reset occurrence signal indicating that the internal reset has occurred. In the present embodiment, the reset occurrence signal output unit 222 is implemented by the WDTRST output terminal 122 (see FIG. 1) of the sub-CPU 120. That is, the reset occurrence signal output unit 222 outputs a WDT reset occurrence pulse WDRST2 (value="0") as the internal-reset occurrence signal.

In response to the internal reset of the sub-CPU 120, the identification signal output unit 223 outputs an identification signal indicating that the sub-CPU 120 is a source where an internal reset has occurred. In the present embodiment, the identification signal output unit 223 is implemented by the GPIO output port 124 (see FIG. 1) of the sub-CPU 120. That is, the identification signal output unit 223 outputs an identification signal S_M_CPU2 (value="1") as the identification signal. Note that output of this identification signal is implemented by the action of the pull-up resistor of the sub-CPU 120.

The external reset signal input unit 224 accepts input of an external reset signal output from the main CPU 110. In the present embodiment, the external reset signal input unit 224 is implemented by the external reset terminal input 125 (see FIG. 1) of the sub-CPU 120. That is, the external reset signal input unit 224 accepts input of an external reset signal CPU2_RST.

When the external reset signal input unit 224 accepts input of the external reset signal, the reset unit 225 resets the sub-CPU 120. The reset performed here by the reset unit 225 is equivalent to a power-on reset. In the present embodiment, the reset unit 225 is implemented by the controller 126 (see FIG. 1) of the sub-CPU 120.

After the reset unit 225 or internal reset unit 221 resets the sub-CPU 120, the initialization processing unit 226 performs predetermined initialization processing of the sub-CPU 120. This initialization processing includes initial setting processing of various kinds of input and output ports. In the present embodiment, the initialization processing unit 226 is implemented by the controller 126 (see FIG. 1) of the sub-CPU 120.

Another Sub-CPU

In the example illustrated in FIG. 2, the sub-CPU 130 includes an internal reset unit 231, a reset occurrence signal output unit 232, an external reset signal input unit 233, a reset unit 234, and an initialization processing unit 235.

When the sub-CPU 130 malfunctions, the internal reset unit 231 internally resets the sub-CPU 130. In the present embodiment, the internal reset unit 231 is implemented by the built-in WDT 131 (see FIG. 1) of the sub-CPU 130.

In response to the internal reset of the sub-CPU 130, the reset occurrence signal output unit 232 outputs an internal-reset occurrence signal indicating that the internal reset has occurred. In the present embodiment, the reset occurrence signal output unit 232 is implemented by the WDTRST output terminal 132 (see FIG. 1) of the sub-CPU 130. That is, the reset occurrence signal output unit 232 outputs a WDT reset occurrence pulse WDRST3 (value="0") as the internal-reset occurrence signal.

The external reset signal input unit 233 accepts input of an external reset signal output from the main CPU 110. In the present embodiment, the external reset signal input unit 233 is implemented by the external reset terminal input 134 (see FIG. 1) of the sub-CPU 130. That is, the external reset signal input unit 233 accepts input of an external reset signal CPU3_RST.

When the external reset signal input unit 233 accepts input of the external reset signal, the reset unit 234 resets the sub-CPU 130. The reset performed here by the reset unit 234 is equivalent to a power-on reset. For example, the reset unit 234 is implemented by the controller 135 (see FIG. 1) of the sub-CPU 130.

After the internal reset unit 231 or reset unit 234 resets the sub-CPU 130, the initialization processing unit 235 performs predetermined initialization processing of the sub-CPU 130. This initialization processing includes initial setting processing of various kinds of input and output ports. In the present embodiment, the initialization processing unit 235 is implemented by the controller 135 (see FIG. 1) of the sub-CPU 130.

Procedure of Processing of Main CPU

Figure 3:
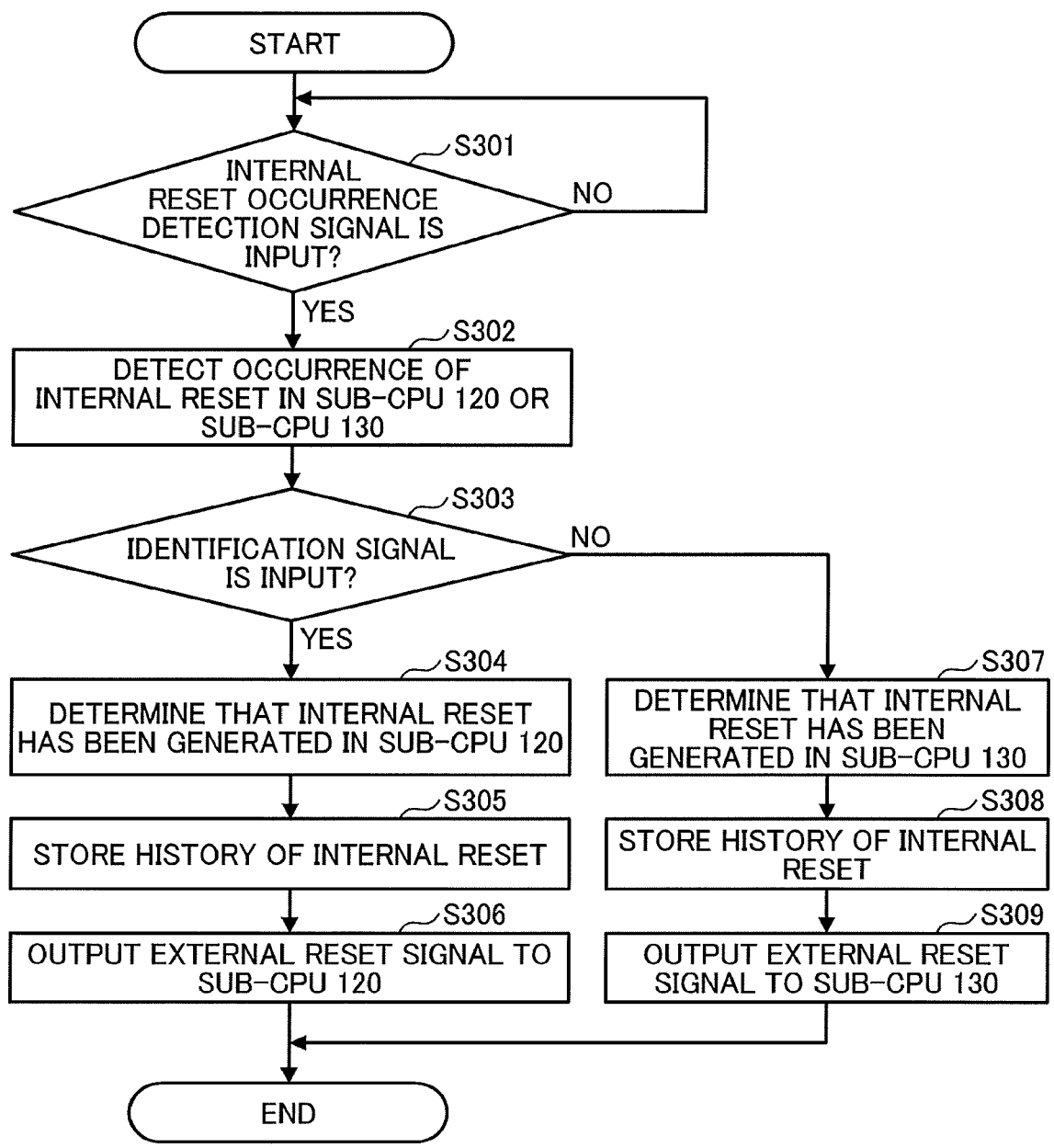
FIG. 3 is a flowchart illustrating a procedure of processes performed in a main CPU of an image forming apparatus according to Embodiment 1.

FIG. 3 is a flowchart illustrating a procedure of processes performed in the main CPU 110 of the image forming apparatus 10 according to Embodiment 1.

At S301, the main CPU 110 determines whether or not the detection signal input unit 211 has accepted input of an internal-reset occurrence detection signal (that is, the detection signal S_CPU_WAKE having value of "0"). When the main CPU 110 determines that the detection signal input unit 211 has not accepted input of the internal-reset occurrence detection signal (No at S301), the main CPU 110 executes the processing at S301 again.

Meanwhile, in a case where the main CPU 110 determines that input of the internal-reset occurrence detection signal has been accepted (Yes at S301), the detector 212 detects the occurrence of an internal reset in the sub-CPU 120 or sub-CPU 130 at S302.

At S303, the main CPU 110 determines whether or not the identification signal input unit 213 has accepted input of an identification signal indicating the source where an internal reset has occurred (that is, the identification signal S_M_CPU2 having value of "1").

When the main CPU 110 determines that input of the identification signal has been accepted (Yes at S303), the identification unit 214 identifies the sub-CPU 120 as the processor where an internal reset has occurred at S304. At S305, the reset history storage 216 stores a history of occurrence of the internal reset. At S306, the external reset signal output unit 215 outputs an external reset signal (the external reset signal CPU2_RST) to the sub-CPU 120. Then, the main CPU 110 ends the series of processing illustrated in FIG. 3.

By contrast, when the main CPU 110 determines that the identification signal input unit 213 has not accepted input of the identification signal (No at S303, at S307, the identification unit 214 identifies the sub-CPU 130 as the processor where the internal reset has occurred. At S308, the reset history storage 216 stores a history of occurrence of the internal reset. At S309, the external reset signal output unit 215 outputs an external reset signal (the external reset signal CPU3_RST) to the sub-CPU 130. Then, the main CPU 110 ends the series of processing illustrated in FIG. 3.

Procedure of Processing of Sub-CPU

Figure 4:
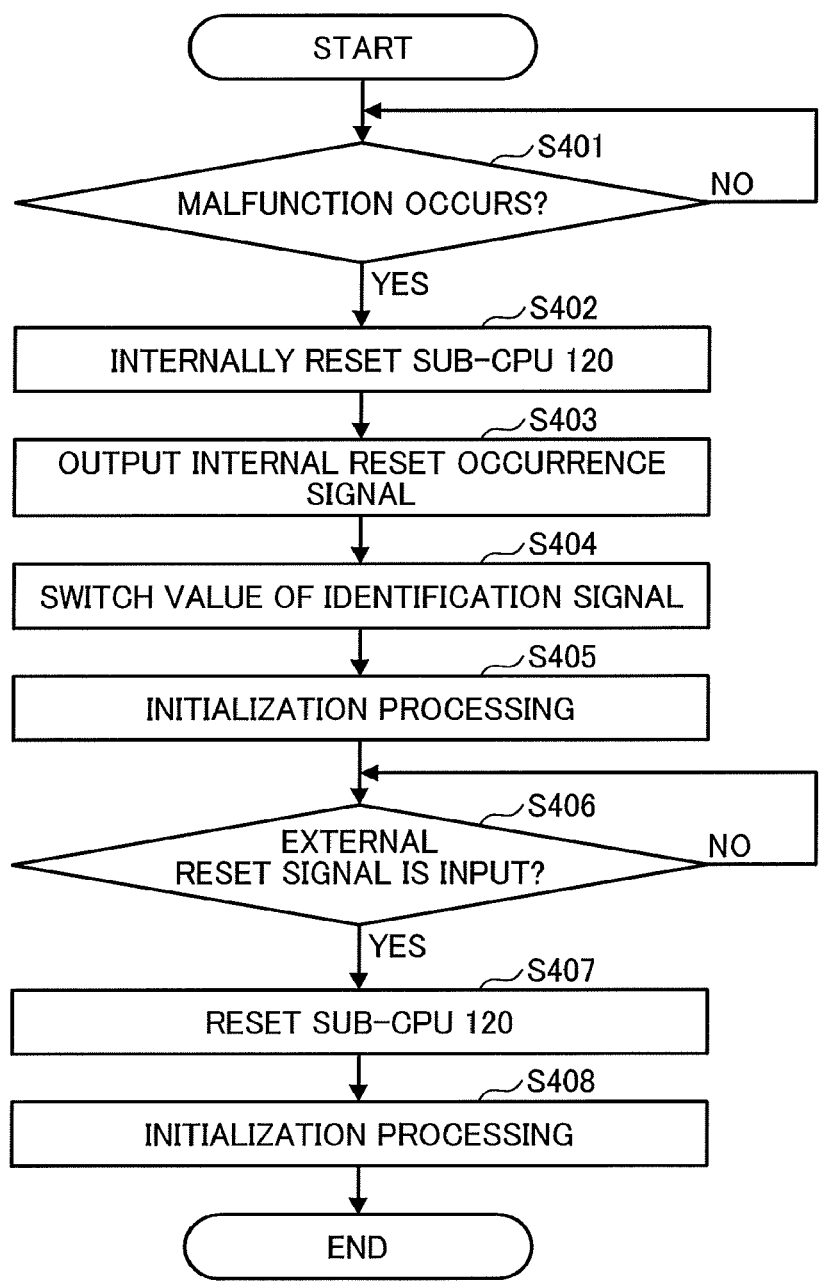
FIG. 4 is a flowchart illustrating a procedure of processes performed in a sub-CPU of the image forming apparatus according to Embodiment 1.

FIG. 4 is a flowchart illustrating a procedure of processes performed in the sub-CPU 120 in the image forming apparatus 10 according to Embodiment 1.

At S401, the internal reset unit 221 determines whether or not malfunction has occurred in the sub-CPU 120. When the internal reset unit 221 determines that the sub-CPU 120 has not malfunctioned (No at S401), the sub-CPU 120 executes the processing at S401 again.

By contrast, when the internal reset unit 221 determines that the sub-CPU 120 has malfunctioned (Yes at 8401), at S402, the internal reset unit 221 internally resets the sub-CPU 120. With this, all the input and output ports of the sub-CPU 120 enter a default state. In response to this, at S403, the reset occurrence signal output unit 222 outputs an internal-reset occurrence signal (that is, the WDT reset occurrence pulse WDRST2 having value of "0"). At S404, the identification signal output unit 223 outputs an identification signal indicating a source where an internal reset has occurred (that is, the identification signal S_M_CPU2 having value of "1"). Output of this identification signal is implemented by the action of the pull-up resistor disposed in the sub-CPU 120.

At S405, the initialization processing unit 226 performs the predetermined initialization processing. In this initialization processing, the initialization processing unit 226 performs setting based on the internal reset with respect to each input or output port.

At S406, the sub-CPU 120 determines whether or not the external reset signal input unit 224 has accepted input of an external reset signal (that is, external reset signal CPU2_RST) output from the main CPU 110.

Determining that input of the external reset signal has not been accepted (No at 8406), the sub-CPU 120 executes the processing at S406 again.

By contrast, when the main CPU 110 determines that input of the external reset signal has been accepted (Yes at S406), at S407, the reset unit 225 resets the sub-CPU 120. With this, all the input and output ports of the sub-CPU 120 enter a default state.

At S408, the initialization processing unit 226 performs the predetermined initialization processing. In this initialization processing, the initialization processing unit 226 performs setting based on the external reset with respect to each input or output port. Then, the sub-CPU 120 ends the series of processing illustrated in FIG. 4.

Note that the procedure of processing of the sub-CPU 130 is similar to the procedure of processing of the sub-CPU 120 illustrated in FIG. 4. Therefore, illustration and description of the procedure of processing of the sub-CPU 130 are omitted to avoid redundancy. However, the procedure of processing of the sub-CPU 130 is different from that of the sub-CPU 120 in that an identification signal (output at S404) is not output.

Timings of Various Kinds of Operation

Figure 5:
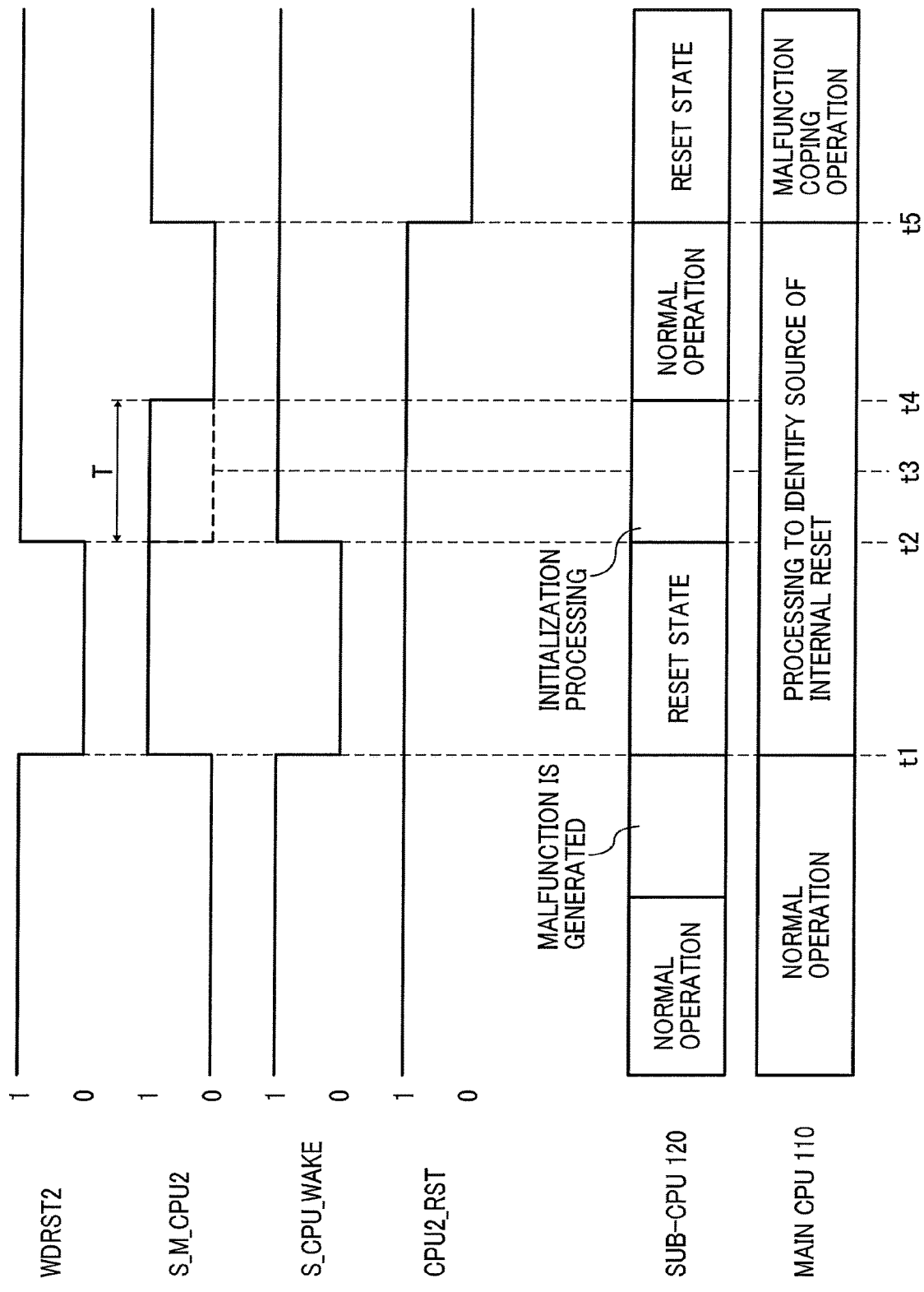
FIG. 5 is a timing chart illustrating timings of various kinds of operation in the image forming apparatus according to Embodiment 1.

FIG. 5 is a timing chart illustrating timings of various kinds of operation in the image forming apparatus 10 according to Embodiment 1. FIG. 5 illustrates timings of various kinds of operation performed in a case where an internal reset has occurred in the sub-CPU 120.

In the example illustrated in FIG. 5, first, when the sub-CPU 120 malfunctions, the internal reset unit 221 internally resets the sub-CPU 120. With this, all the terminals of the sub-CPU 120 enter a default state. In response to this, a value of a WDT reset occurrence pulse WDRST2 output from the sub-CPU 120 is switched from "1" indicating reset cancel to "0" indicating a reset state at timing t1.

Further, in response to the internal reset of the sub-CPU 120, the GPIO output port 124 is switched from an output setting state to an input setting state at the timing t1. Accordingly, the value of an identification signal S_M_CPU2 output from the GPIO output port 124 is switched from "0" indicating a normal operation state (output setting) to "1" indicating a reset state (input setting).

Note that switching of this identification signal is implemented by the action of the pull-up resistor disposed in the sub-CPU 120.

Furthermore, in response to the switching of the value of the WDT reset occurrence pulse WDRST2 to "0", the value of a detection signal S_CPU_WAKE to be input to the interrupt port 113 is switched from "1" to "0" at the timing t1. With this, in the main CPU 110, the detector 212 detects the occurrence of an internal reset in the sub-CPU 120 or sub-CPU 130. Then, the main CPU 110 starts, as interrupt processing, processing to identify the internally reset device where an internal reset has occurred.

Thereafter, when the initialization processing unit 226 starts the initialization processing in the sub-CPU 120, the value of the WDT reset occurrence pulse WDRST2 output from the sub-CPU 120 is switched from "0" indicating a reset state to "1" indicating reset cancel at timing t2.

Herein, the initialization processing unit 226 refers to the WDT reset status register 123 to determine whether the reset of the sub-CPU 120 is caused by the built-in WDT 121 or due to another factor. Then, the initialization processing unit 226 performs different initialization processing between a case of the reset by the built-in WDT 121 and a case of the reset due to another factor.

For example, in a case of the reset by the built-in WDT 121, the initialization processing unit 226 returns the GPIO output port 124 from the input setting state to the output setting state after a predetermined standby time T elapses from the start of the initialization processing. Accordingly, the value of the identification signal S_M_CPU2 output from the GPIO output port 124 is kept at "1" until the predetermined standby time T elapses. The value of the identification signal S_M_CPU2 is returned from "1" to "0" when the predetermined standby time T elapses.

For example, in the example illustrated in FIG. 5, the value of the identification signal S_M_CPU2 is kept at "1" indicating the reset state (input setting) from the timing t2 at which the initialization processing of the sub-CPU 120 is started to a timing t4 at which the predetermined standby time T elapses. The value of the identification signal S_M_CPU2 is returned to "0" indicating a normal operation state (output setting) at the timing t4 at which the predetermined standby time T elapses. With this, the main CPU 110 can identify the sub-CPU 120 as the processor where an internal reset has occurred at a timing t3 between the start of the initialization processing of the sub-CPU 120 and the lapse of the predetermined standby time T.

In a case where the value of the identification signal S_M_CPU2 is "1" at this time, the main CPU 110 identifies the sub-CPU 120 as the source where an internal reset has occurred. By contrast, in a case where the value of the identification signal S_M_CPU2 is "0", the main CPU 110 identifies the sub-CPU 130 as the source where an internal reset has occurred.

By contrast, in a case of the reset due to another factor, the initialization processing unit 226 returns the GPIO output port 124 from the input setting state to the output setting state immediately after starting the initialization processing. Accordingly, the value of the identification signal S_M_CPU2 to be output from the GPIO output port 124 is returned from "1" to "0" immediately after the initialization processing of the sub-CPU 120 is started.

When the processing to identify the internally reset device is completed, the main CPU 110 starts predetermined malfunction coping operation at timing t5. The malfunction coping operation includes outputting an external reset signal CPU2_RST to the sub-CPU 120 to hard-reset the sub-CPU 120.

Procedure of Initialization Processing

Figure 6:
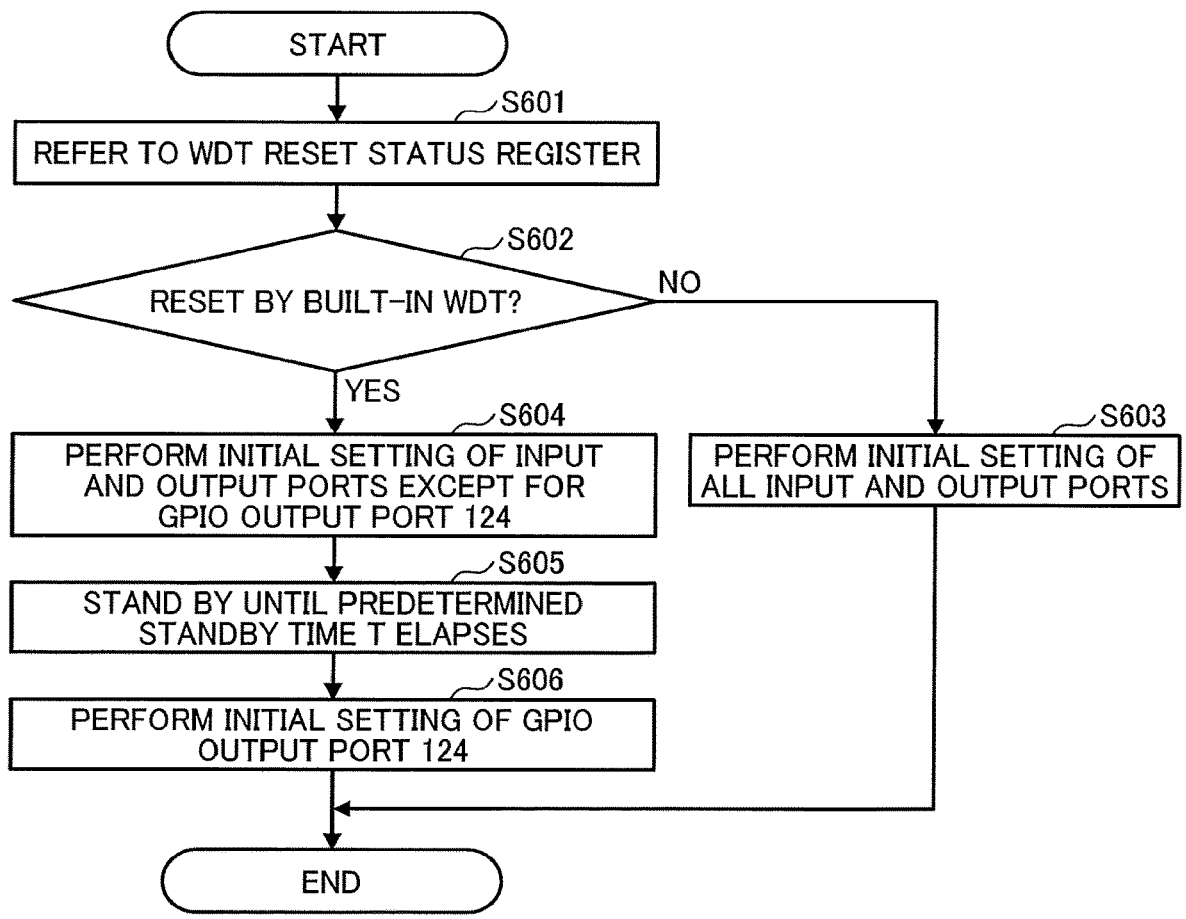
FIG. 6 is a flowchart illustrating a procedure of initialization processing performed by an initialization processing unit in the image forming apparatus according to Embodiment 1.

FIG. 6 is a flowchart illustrating a procedure of initialization processing performed by the initialization processing unit 226 in the image forming apparatus 10 according to Embodiment 1.

At S601, the initialization processing unit 226 refers to the WDT reset status register 123. Based on the result of reference at S601, at S602, the initialization processing unit 226 determines whether or not a reset of the sub-CPU 120 is caused by the built-in WDT 121.

Determining that the reset of the sub-CPU 120 is not a reset by the built-in WDT 121 (No at S602), the initialization processing unit 226 performs initial setting of all the input and output ports at S603. Then, the initialization processing unit 226 ends the series of processing illustrated in FIG. 6.

By contrast, determining that the reset of the sub-CPU 120 is caused by the built-in WDT 121 (Yes at S602), the initialization processing unit 226 performs initial setting of all the input and output ports except for the GPIO output port 124 at S604. At S605, the initialization processing unit 226 enters a standby state until the predetermined standby time T elapses. At S606, the initialization processing unit 226 performs initial setting of the GPIO output port 124. Then, the initialization processing unit 226 ends the series of processing illustrated in FIG. 6.

According to the initialization processing in FIG. 6, in a case where an internal reset has occurred in the sub-CPU 120, an initial setting timing of the GPIO output port 124 from which the identification signal S_M_CPU2 is output is delayed. With this, the main CPU 110 can identify the sub-CPU 120 as the processor where an internal reset has occurred also after the initialization processing of the sub-CPU 120 is started.

As described above, the image forming apparatus 10 according to the present embodiment is configured to cause a processor being the source of occurrence of internal reset to output an internal-reset occurrence signal and, in response to this, cause an internal-reset occurrence detection signal to be input to the interrupt port 113 of the main CPU 110. With this, the main CPU 110 can easily identify occurrence of the internal reset in one of the sub-CPUs 120 and 130.

The image forming apparatus 10 according to the present embodiment is further configured so that the sub-CPU 120 outputs an identification signal in a case where an internal reset has occurred in the sub-CPU 120. With this, based on presence or absence of the identification signal, the main CPU 110 can identify which one of the sub-CPUs 120 and 130 is the source where an internal reset has occurred.

Further, in the image forming apparatus 10 according to the present embodiment, an AND signal of internal-reset occurrence signals output from a plurality of processors is input to the main CPU 110 as the internal-reset occurrence detection signal. Therefore, with a simple configuration in which a single signal is referred to by using a single port, the main CPU 110 can easily identify occurrence of the internal reset in one of the processors.

Embodiment 2

Embodiment 2 is described below with reference to FIGS. 7 and 8. In Embodiment 2, descriptions are given below of an example where a plurality of second processors, such as sub-CPUs 120 and 130A, and a plurality of connected devices, such as input/output application specific integrated circuits (IO-ASICs) 151 and 152, are connected to a main CPU 110A. Note that, in the following description, a difference from Embodiment 1 will be described, and elements that function similar to the elements according to Embodiment 1 are given reference numerals similar to those in Embodiment 1 and redundant descriptions are omitted.

Configuration of Image Forming Apparatus

Figure 7:
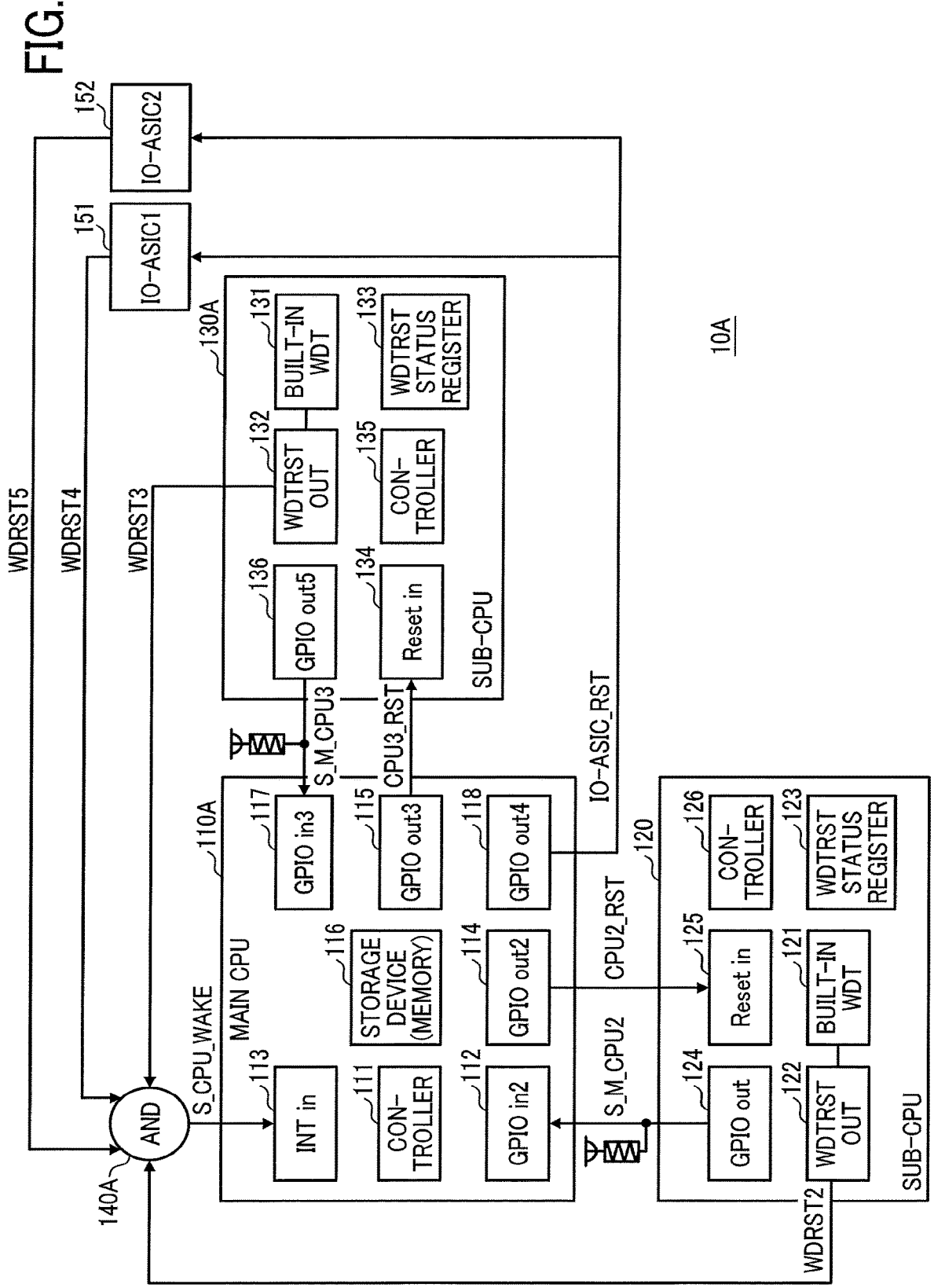
FIG. 7 is a schematic view of an image forming apparatus according to Embodiment 2.

FIG. 7 is a schematic view of an image forming apparatus 10A according to Embodiment 2. The image forming apparatus 10A illustrated in FIG. 7 is different from the image forming apparatus 10 illustrated in FIG. 1 according to Embodiment 1, in including:

the main CPU 110A instead of the main CPU 110;
the sub-CPU 130A instead of the sub-CPU 130;
an AND circuit 140A instead of the AND circuit 140; and
the IO-ASIC 151 and the IO-ASIC 152.

The sub-CPU 130A is similar in mechanical configuration and functional configuration to the sub-CPU 120. That is, the sub-CPU 130A, as well as the sub-CPU 120, is an example of "second processor" and has a function of outputting an identification signal of a source of occurrence of an internal reset. Specifically, the sub-CPU 130A is different from the sub-CPU 130 according to Embodiment 1 in that the sub-CPU 130A further includes a GPIO output port 136. The GPIO output port 136 is a terminal to output an identification signal S_M_CPU3 (an example of "identification signal"). The identification signal S_M_CPU3 normally has a value "0". The value of the identification signal S_M_CPU3 becomes "1" in response to an internal reset of the sub-CPU 130A by the built-in WDT 131. This indicates that the sub-CPU 130A is a device that is a source where an internal reset has occurred.

The main CPU 110A is different from the main CPU 110 according to Embodiment 1 in that the main CPU 110A further includes a GPIO input port 117 and a GPIO output port 118. The GPIO input port 117 is a terminal to which the identification signal S_M_CPU3 output from the sub-CPU 130A is input. The GPIO output port 118 is a terminal to output an external reset signal IO_ASIC_RST to the IO-ASIC 151 or 152, in a case where the IO-ASIC 151 or 152 is identified as the source of occurrence of an internal reset.

The IO-ASIC 151 and the IO-ASIC 152 are for controlling a device such as a sensor or a motor. The IO-ASICs 151 and 152, as well as the sub-CPUs 120 and 130A, include a built-in WDT. In a case where the built-in WDTs perform internal resets, the IO-ASICs 151 and 152 output internal-reset occurrence signals (WDT reset occurrence pulses WDRST4 and WDRST5). Further, the IO-ASIC 151 and the IO-ASIC 152 are externally reset in response to acceptance of the external reset signal IO_ASIC_RST.

The AND circuit 140A performs logical operation (AND operation) of the following four signals:

WDT reset occurrence pulse WDRST2 output from the sub-CPU 120;
WDT reset occurrence pulse WDRST3 output from the sub-CPU 130A;
WDT reset occurrence pulse WDRST4 output from the IO-ASIC 151; and
WDT reset occurrence pulse WDRST5 output from the IO-ASIC 152.

With this, the AND circuit 140A generates a detection signal S_CPU_WAKE and outputs the detection signal S_CPU_WAKE. In Embodiment 2, a value of the detection signal S_CPU_WAKE is normally "1". The value of the detection signal S_CPU_WAKE becomes "0" when an internal reset has occurred in one of the sub-CPU 120, the sub-CPU 130A, the IO-ASIC 151, and the IO-ASIC 152.

Therefore, when the value of the detection signal S_CPU_WAKE input through the interrupt port 113 becomes "0", the main CPU 110A can detect occurrence of the internal reset in one of the sub-CPUs 120 and 130A and the IO-ASICs 151 and 152.

Procedure of Processing of Main CPU

Figure 8A:
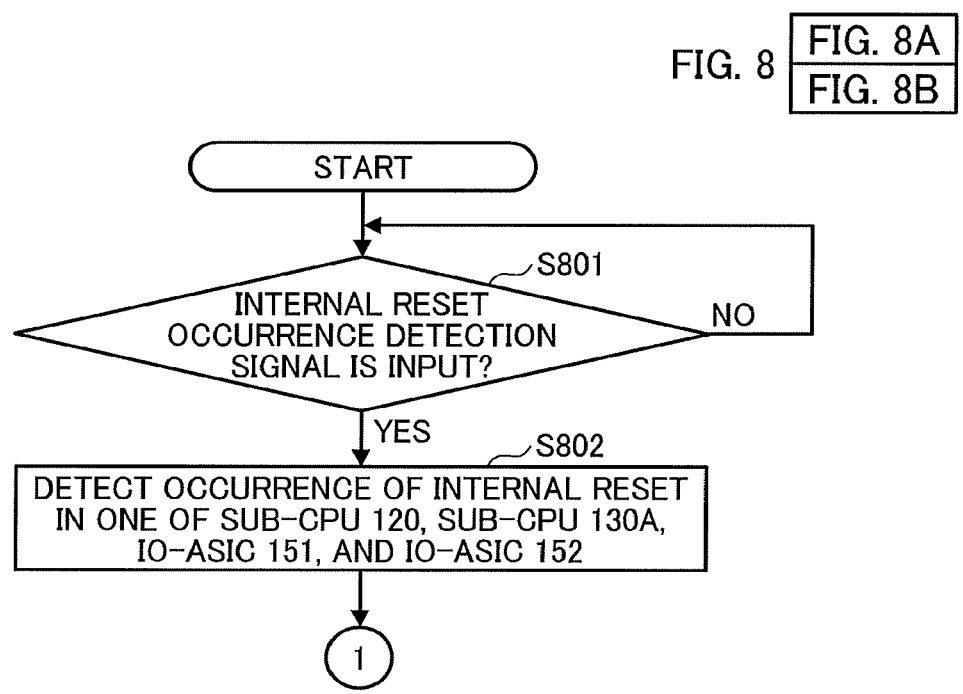

FIGS. 8A and 8B are a flowchart illustrating a procedure of processes performed by the main CPU 110A of the image forming apparatus 10A according to Embodiment 2.

At S801, the main CPU 110A determines whether or not the detection signal input unit 211 has accepted input of an internal-reset occurrence detection signal (that is, the detection signal S_CPU_WAKE having value of "0"). Determining that input of the internal-reset occurrence detection signal has not been accepted (No at S801), the main CPU 110A executes the processing in step S801 again.

By contrast, determining input of the internal-reset occurrence detection signal has been accepted (Yes at S801), at S802, the detector 212 detects the occurrence of an internal reset in one of the sub-CPUs 120 and 130A and the IO-ASICs 151 and 152.

At S803, the main CPU 110A determines whether or not the identification signal input unit 213 has accepted input of an identification signal S_M_CPU2 (value="1").

When the main CPU 110 determines that input of the identification signal S_M_CPU2 has been accepted (step S803: Yes), the identification unit 214 identifies the sub-CPU 120 as the processor where an internal reset has occurred at S804. At S805, the reset history storage 216 stores a history of occurrence of the internal reset. At S806, the external reset signal output unit 215 outputs an external reset signal (external reset signal CPU2_RST) to the sub-CPU 120. Thereafter, the main CPU 110A ends the series of processing illustrated in FIGS. 8A and 8B.

By contrast, when the main CPU 110A determines that input of the identification signal S_M_CPU2 has not been accepted (step S803: No), the main CPU 110A determines whether or not the identification signal input unit 213 has accepted input of the identification signal S_M_CPU3 (value="1") at S807.

When the main CPU 110A determines that input of the identification signal S_M_CPU3 has been accepted (Yes at S807), the identification unit 214 identifies the sub-CPU 130A as the processor where an internal reset has occurred at S808. At S809, the reset history storage 216 stores a history of occurrence of the internal reset. At S810, the external reset signal output unit 215 outputs an external reset signal (external reset signal CPU3_RST) to the sub-CPU 130A. Thereafter, the main CPU 110A ends the series of processing illustrated in FIGS. 8A and 8B.

By contrast, when the main CPU 110A determines that input of the identification signal S_M_CPU3 has not been accepted (No at S807, the identification unit 214 identifies one of the IO-ASICs 151 and 152 as the source where an internal reset has occurred at S811. At S812, the reset history storage 216 stores a history of occurrence of the internal reset. At S813, the external reset signal output unit 215 outputs an external reset signal (external reset signal IO_ASIC_RST) to each of the IO-ASICs 151 and 152. Thereafter, the main CPU 110A ends the series of processing illustrated in FIGS. 8A and 8B.

Note that the procedures of processing of the sub-CPUs 120 and 130A according to Embodiment 2 are similar to those of the sub-CPU 120 according to Embodiment 1 illustrated in FIG. 4 and FIG. 6. Therefore, illustration and description of the procedures of processing of the sub-CPUs 120 and 130A according to Embodiment 2 are omitted.

As described above, in the image forming apparatus 10A according to Embodiment 2, the sub-CPUs 120 and 130A are configured to output, to the main CPU 110A, identification information indicating the source where an internal reset has occurred. With this, even in a case where further the IO-ASICs 151 and 152 are connected thereto, the main CPU 110A can easily identify which one of the sub-CPUs 120 and 130A is the source where the internal reset has occurred.

Note that, according to Embodiment 2, at least one of the IO-ASICs 151 and 152, as well as the sub-CPUs 120 and 130A, may be configured to output, to the main CPU 110A, identification information indicating the source where an internal reset has occurred. With this, the main CPU 110A can easily identify which one of the IO-ASICs 151 and 152 is the source where the internal reset has occurred.

Embodiment 3

Embodiment 3 is described below with reference to FIGS. 9 to 12. Embodiment 3 described below concerns an example in which a second processor (sub-CPU 120B) and a connected device (IO-ASIC 153) are connected (in daisy-chain connection) to a main CPU 110B in series and occurrence of an internal reset in each device is detected. Note that, in the following description of Embodiment 3, a difference from Embodiment 1 will be described, and elements that function similar to the elements of Embodiment 1 are given reference numerals similar to those in Embodiment 1 and redundant descriptions are omitted.

Configuration of Image Forming Apparatus

Figure 9:
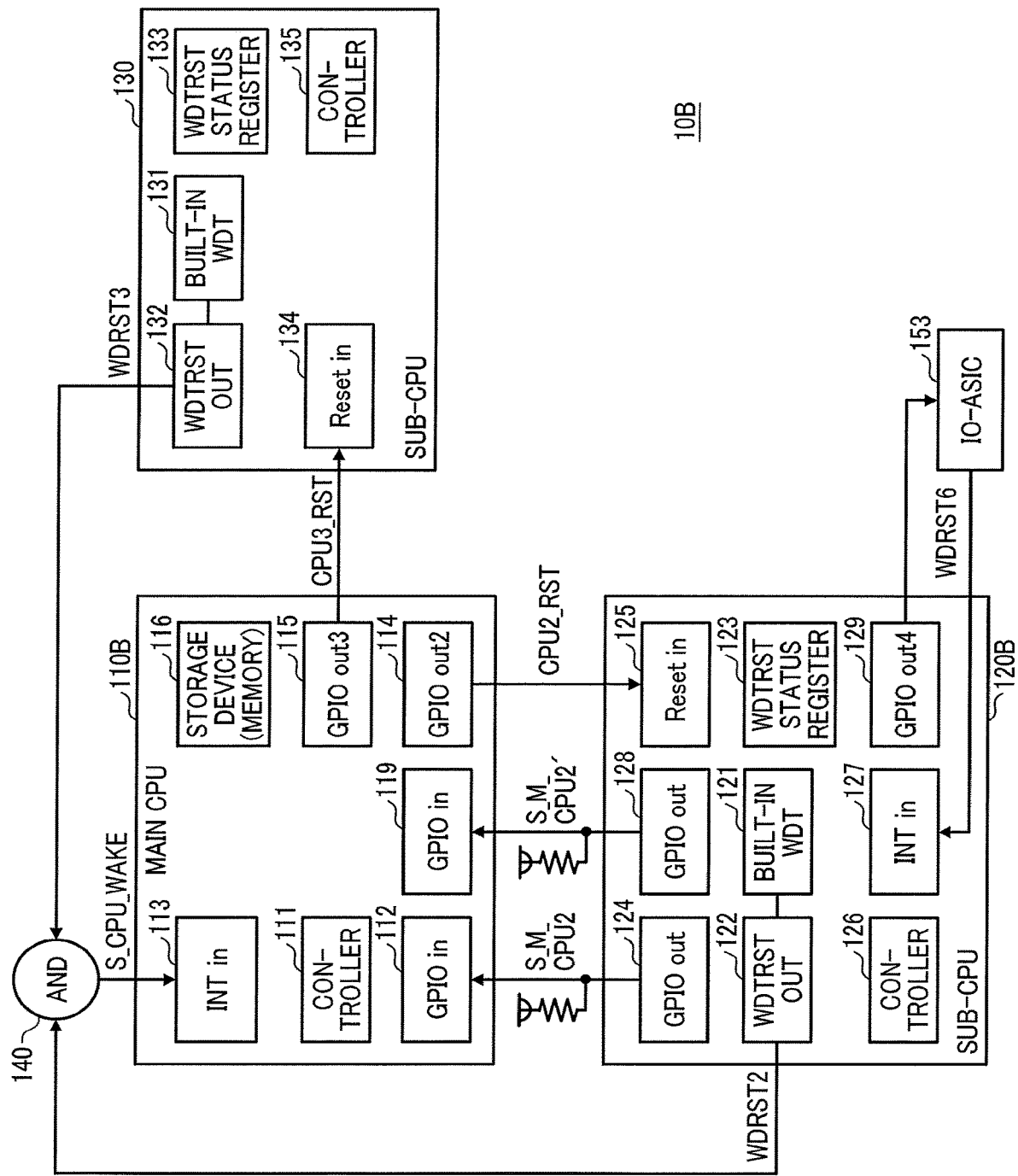
FIG. 9 is a schematic view of an image forming apparatus according to Embodiment 3.

FIG. 9 is a schematic view of an image forming apparatus 10B according to Embodiment 3. The image forming apparatus 10B illustrated in FIG. 9 is different from the image forming apparatus 10 (see FIG. 1) according to Embodiment 1 in including the main CPU 110B, instead of the main CPU 110, and including the sub-CPU 120B, instead of the sub-CPU 120, and further including an IO-ASIC 153.

The IO-ASIC 153 is for controlling a device such as a sensor or a motor. The IO-ASIC 153, as well as the sub-CPUs 120B and 130, includes a built-in WDT (internal reset unit) that performs an internal reset when a malfunction occurs. Further, the IO-ASIC 153 has a configuration (reset occurrence signal output unit) that outputs an internal-reset occurrence signal (WDT reset occurrence pulse WDRST6) in a case where the built-in WDT performs an internal reset. Further, the IO-ASIC 153 is externally reset in response to reception of an external reset signal IO_ASIC_RST. As illustrated in FIG. 9, the IO-ASIC 153 is not connected to the main CPU 110B but is connected to the sub-CPU 120B. Therefore, the main CPU 110B is notified of the occurrence of an internal reset in the IO-ASIC 153 via the sub-CPU 120B.

The sub-CPU 120B is different from the sub-CPU 120 according to Embodiment 1 in that the sub-CPU 120B further includes an interrupt port 127, a GPIO output port 128, and a GPIO output port 129. The interrupt port 127 is a terminal to which the WDT reset occurrence pulse WDRST6 output from the IO-ASIC 153 is input. The GPIO output port 128 is a terminal to output an identification signal S_M_CPU2' to the main CPU 110B. The identification signal S_M_CPU2' normally has a value "0". The value of the identification signal S_M_CPU2' becomes "1" in response to input of the WDT reset occurrence pulse WDRST6 through the interrupt port 127. This indicates that the IO-ASIC 153 is a device where the internal reset has occurred. The GPIO output port 129 is a terminal to output an external reset signal IO_ASIC_RST for resetting the IO-ASIC 153 to the IO-ASIC 153, in a case where an internal reset has occurred in the IO-ASIC 153.

The main CPU 110B is different from the main CPU 110 according to Embodiment 1 in that the main CPU 110B further includes a GPIO input port 119. The GPIO input port 119 is a terminal to which the identification signal S_M_CPU2' output from the sub-CPU 120B is input. As described above, the main CPU 110B includes two GPIO input ports 112 and 119 as input ports for the sub-CPU 120B. With this, in a case where an identification signal S_M_CPU2 (first identification signal) output from the sub-CPU 120B is input through the GPIO input port 112, the main CPU 110B can identify the sub-CPU 120B as a source where the internal reset has occurred. By contrast, in a case where an identification signal S_M_CPU2' (second identification signal) output from the sub-CPU 120B is input through the GPIO input port 119, the main CPU 110B can identify the IO-ASIC 153 as a source where the internal reset has occurred.

Procedure of Processing of Main CPU

Figure 10B:
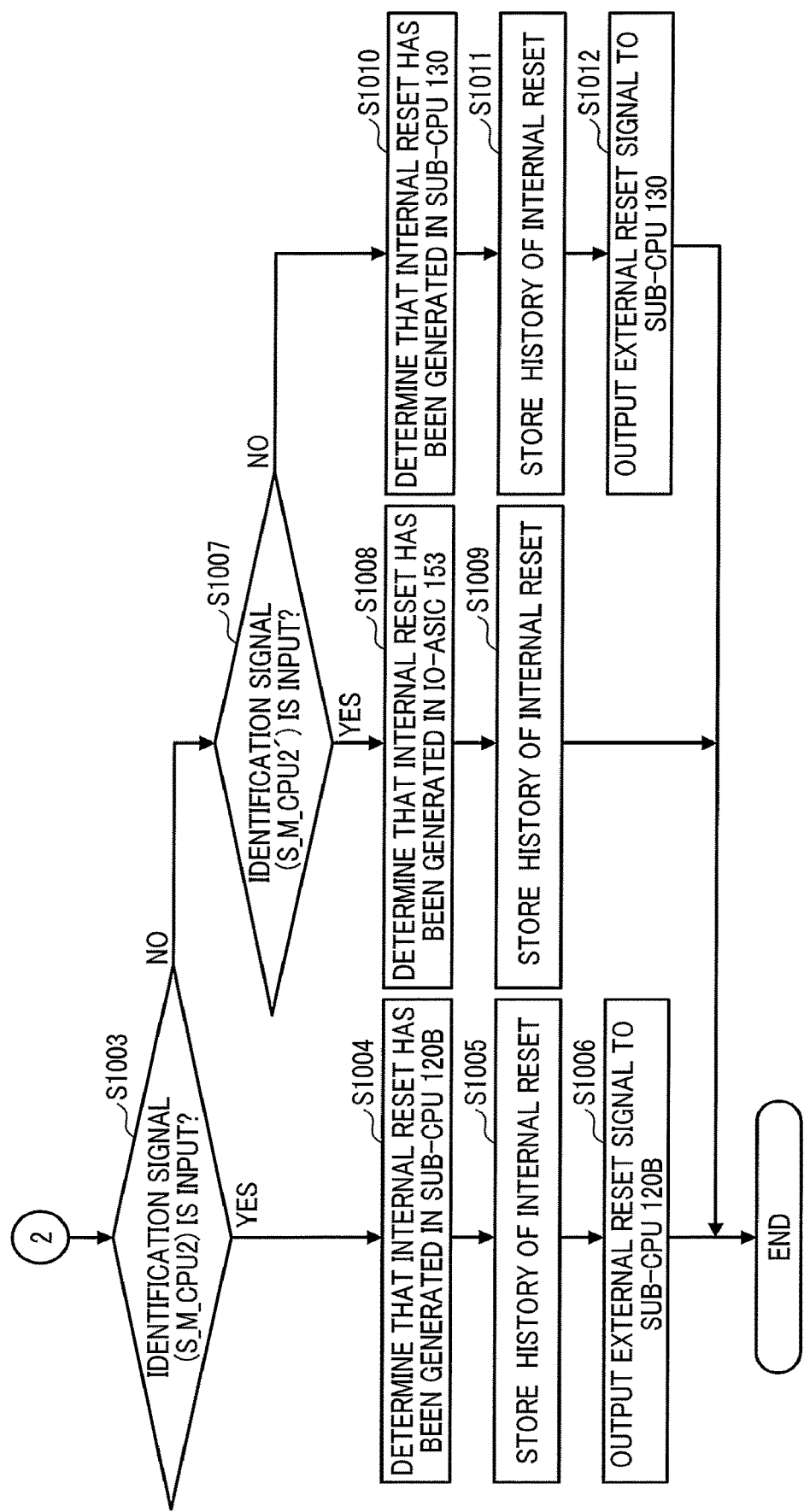

FIGS. 10A and 10B are flowcharts illustrating a procedure of processes performed in the main CPU 110B of the image forming apparatus 10B according to Embodiment 3.

At S1001, the main CPU 110B determines whether or not the detection signal input unit 211 has accepted input of an internal-reset occurrence detection signal (that is, detection signal S_CPU_WAKE having value of "0"). Determining that input of the internal-reset occurrence detection signal has not been accepted (No at S1001), the main CPU 110B executes the processing at S1001 again.

By contrast, in a case where the main CPU 110B determines that input of the internal-reset occurrence detection signal has been accepted (Yes at S1001), the detector 212 detects the occurrence of an internal reset in one of the sub-CPU 120B, the sub-CPU 130, and the IO-ASIC 153 at S1002.

At S1003, whether or not the identification signal input unit 213 has accepted input of an identification signal S_M_CPU2 (value="1") is determined.

In a case where the main CPU 110B determines that input of the identification signal S_M_CPU2 has been accepted (step S1003: Yes), the identification unit 214 identifies the sub-CPU 120B as a processor where an internal reset has occurred at S1004. At S1005, the reset history storage 216 stores a history of occurrence of the internal reset. At S1006, the external reset signal output unit 215 outputs an external reset signal (external reset signal CPU2_RST) to the sub-CPU 120B. Thereafter, the main CPU 110B ends the series of processing illustrated in FIGS. 10A and 10B.

By contrast, in a case where the main CPU 110B that input of the identification signal S_M_CPU2 has not been accepted (step S1003: No), the main CPU 110B determines whether or not the identification signal input unit 213 has accepted input of the identification signal S_M_CPU2' (value="1") at S1007.

In a case where the main CPU 110B determines that input of the identification signal S_M_CPU2' has been accepted (step S1007: Yes), the identification unit 214 identifies the IO-ASIC 153 as a device that is the source where an internal reset has occurred at S1008. Then, the reset history storage 216 stores a history of occurrence of the internal reset (step S1009). Thereafter, the main CPU 110B ends the series of processing illustrated in FIGS. 10A and 10B.

By contrast, in a case where the main CPU 110B determines that input of the identification signal S_M_CPU2' has not been accepted (step S1007: No), the identification unit 214 identifies the sub-CPU 130 as a processor where an internal reset has occurred at step S1010. At S1011, the reset history storage 216 stores a history of occurrence of the internal reset. At S1012, the external reset signal output unit 215 outputs an external reset signal (external reset signal CPU3_RST) to the sub-CPU 130. Thereafter, the main CPU 110B ends the series of processing illustrated in FIGS. 10A and 10B.

Procedure of Processing of Sub-CPU

Figure 11:
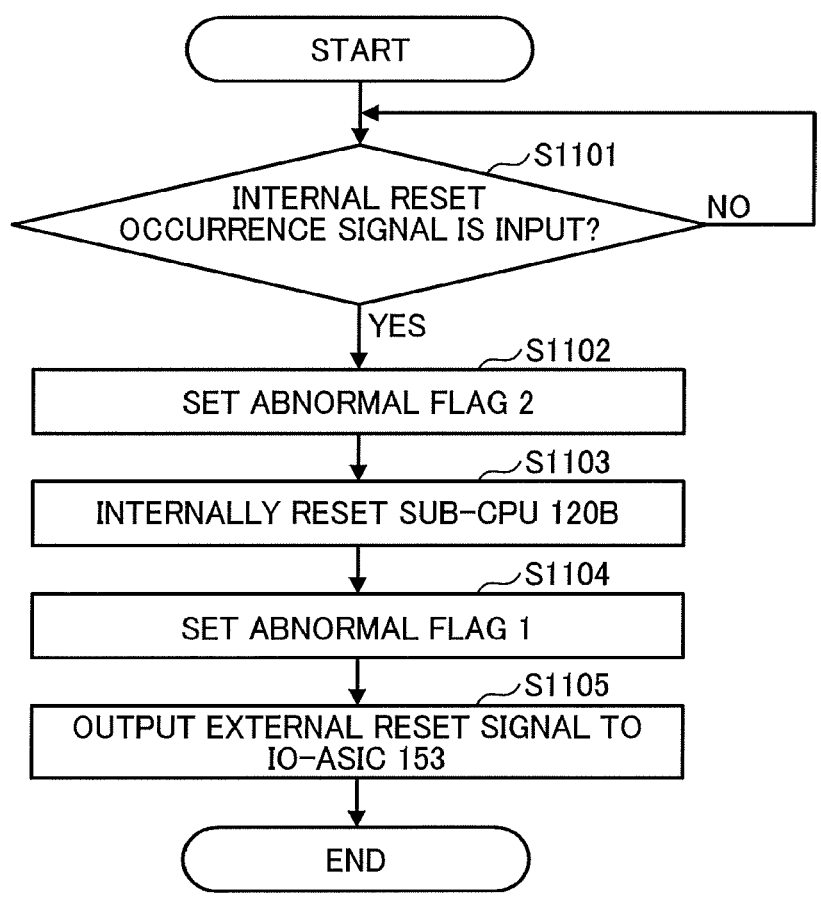
FIG. 11 is a flowchart illustrating a procedure of processes performed in a sub-CPU of the image forming apparatus in Embodiment 3.

FIG. 11 is a flowchart illustrating a procedure of processes performed in the sub-CPU 120B in the image forming apparatus 10B according to Embodiment 3. Herein, descriptions are given below of processing executed by the sub-CPU 120B when a WDT reset occurrence pulse WDRST6 output from the IO-ASIC 153 is input to the sub-CPU 120B.

Note that the sub-CPU 120B further includes, in addition to the function of the sub-CPU 120 illustrated in FIG. 2, a connected device controller that performs various kinds of control in a case where an internal reset has occurred in the IO-ASIC 153. That is, the processing in FIG. 11 is executed by the connected device controller. The connected device controller is implemented by, for example, the controller 126 (see FIG. 9) of the sub-CPU 120B.

At S1101, the connected device controller determines whether or not input of an internal-reset occurrence signal (WDT reset occurrence pulse WDRST6) output from the IO-ASIC 153 has been accepted. When the connected device controller determines that input of the internal-reset occurrence signal has not been accepted (step S1101: No), the connected device controller executes the processing in step S1101 again.

By contrast, when the connected device controller determines that input of the internal-reset occurrence signal has been accepted (step S1101: Yes), the connected device controller sets an abnormal flag 2 in the WDT reset status register 123 at S1102. The abnormal flag 2 indicates that an internal reset has occurred in the IO-ASIC 153.

At S1103, the connected device controller internally resets the sub-CPU 120B. At S1104, the connected device controller further sets an abnormal flag 1 in the WDT reset status register 123. The abnormal flag 1 indicates that an internal reset has occurred in the sub-CPU 120B.

At S1105, the connected device controller outputs an external reset signal (external reset signal CPU2_RST) to the IO-ASIC 153. Thereafter, the connected device controller ends the series of processing illustrated in FIG. 11.

Procedure of Initialization Processing

FIG. 12 is a flowchart illustrating a procedure of initialization processing performed by the initialization processing unit 226 in the image forming apparatus 10B according to Embodiment 3.

At S1201, the initialization processing unit 226 refers to the WDT reset status register 123. At step S1202, based on a result of the reference in step S1201, the initialization processing unit 226 determines whether or not the abnormal flag 1 is set in the WDT reset status register 123.

In a case where the initialization processing unit 226 determines that the abnormal flag 1 is set (step S1202: Yes), the initialization processing unit 226 performs initial setting of all the input and output ports except for the GPIO output port 124 at S1203. At S1204, the initialization processing unit 226 enters a standby state until the predetermined standby time T elapses. At S1205, the initialization processing unit 226 performs initial setting of the GPIO output port 124. Then, the initialization processing unit 226 ends the series of processing illustrated in FIG. 12.

By contrast, in a case where the initialization processing unit 226 does not determine that the abnormal flag 1 is set (step S1202: No), the initialization processing unit 226 determines, based on the result of the reference in step S1201, whether or not both the abnormal flag 1 and the abnormal flag 2 are set in the WDT reset status register 123 at S1206.

In a case where the initialization processing unit 226 determines that both the abnormal flag 1 and the abnormal flag 2 are set (step S1206: Yes), the initialization processing unit 226 performs initial setting of all the input and output ports except for the GPIO output port 128 at S1207. At S1208, the initialization processing unit 226 stands by until the predetermined standby time T elapses. At S1209, the initialization processing unit 226 performs initial setting of the GPIO output port 128. Then, the initialization processing unit 226 ends the series of processing illustrated in FIG. 12.

By contrast, in a case where he initialization processing unit 226 does not determine that both the abnormal flag 1 and the abnormal flag 2 are set (step S1206: No), the initialization processing unit 226 performs initial setting of all the input and output ports at step S1210. Then, the initialization processing unit 226 ends the series of processing illustrated in FIG. 12.

According to the initialization processing in FIG. 12, in a case where an internal reset has occurred in the sub-CPU 120B (that is, the abnormal flag 1 is set), an initial setting timing of the GPIO output port 124 to output the identification signal S_M_CPU2 is delayed. With this, the main CPU 110B can identify the sub-CPU 1201 as the processor where the internal reset has occurred also after a reset state of the sub-CPU 120B is canceled.

Further, in a case where an internal reset has occurred in the IO-ASIC 153 (that is, both the abnormal flags 1 and 2 are set), an initial setting timing of the GPIO output port 128 to output an identification signal S_M_CPU2' is delayed. With this, the main CPU 110B can identify the IO-ASIC 153 as the processor where the internal reset has occurred also after initialization processing of the sub-CPU 120B is started.

As described above, in the image forming apparatus 10B according to Embodiment 3, the sub-CPU 120B report, to the main CPU 110B, both the occurrence of an internal reset in the sub-CPU 120B and the occurrence of an internal reset in the IO-ASIC 153. With this, the main CPU 110B can also easily identify whether or not the IO-ASIC 153 that is not directly connected thereto is the source of the internal reset.

Note that, although aspects of this disclosure are applied to an image forming apparatus in the embodiments described above, application of aspects of this disclosure are not limited thereto. The aspects of this disclosure are also applicable to any electronic device as long as the electronic device includes a plurality of processors.

In the embodiments described above, the first processor (e.g., the main CPU 110) identifies the source (a processor or device) of internal reset to send an external reset signal thereto. However, the purpose of identifying the source of internal reset is not limited thereto. The aspects of this disclosure may adapt to identify the source (a processor or device) for other purposes.

Further, in the embodiments described above, the logical value ("0" and "1") may be inverted in various kinds of signals. For example, a value of each internal-reset occurrence signal may be normally "0" and may be "1" when an internal reset is generated.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An electronic apparatus, comprising:
a first processor; and
at least one second processor,
the first processor configured to:
   detect an output of an internal-reset occurrence signal from the at least one second processor, the internal-reset occurrence signal indicating that an internal reset has occurred; and
   identify, as a source of the internal reset, the at least one second processor in response to the output of the internal-reset occurrence signal and an input of an identification signal from the at least one second processor; and
the at least one second processor configured to:
   perform the internal reset of the at least one second processor in response to an occurrence of a malfunction of the at least one second processor;
   output the internal-reset occurrence signal in response to the internal reset of the at least one second processor; and
   output, to the first processor as the identification signal and in response to the occurrence of the internal reset of the at least one second processor, a signal that indicates the source of the internal reset and that changes in value in response to the internal reset of the at least one second processor.

2. The electronic apparatus according to claim 1, wherein the first processor is further configured to output an external reset signal to the at least one second processor identified as the source of the internal reset.

3. The electronic apparatus according to claim 1, further comprising a logic circuit configured to generate an internal-reset occurrence detection signal in response to the output of the internal-reset occurrence signal from the at least one second processor, wherein
the first processor is configured to detect the occurrence of the internal reset in the at least one second processor in response to an input of the internal-reset occurrence detection signal.

4. The electronic apparatus according to claim 3, wherein
the internal-reset occurrence signal indicates, with a logical value, whether the internal reset has occurred,
the internal-reset occurrence detection signal indicates, with a logical value, whether the occurrence of the internal reset is detected, and
the logic circuit is further configured to:
   perform a logical operation of the internal-reset occurrence signal output from the at least one second processor, to generate the internal-reset occurrence detection signal; and output the internal-reset occurrence detection signal to the first processor.

5. The electronic apparatus according to claim 1, further comprising a logic circuit configured to:
perform a logical operation of the internal-reset occurrence signal output from the at least one second processor, to generate an internal-reset occurrence detection signal; and
output the internal-reset occurrence detection signal to the first processor, wherein
the internal-reset occurrence signal indicates, with a logical value, whether the internal reset has occurred, and
the internal-reset occurrence detection signal indicates, with a logical value, whether the occurrence of the internal reset is detected.

6. The electronic apparatus according to claim 1,
wherein the at least one second processor further includes a plurality of terminals including a predetermined input terminal to output the identification signal.

7. The electronic apparatus according to claim 6, wherein the at least one second processor is further configured to initialize the plurality of terminals after the internal reset of the at least one second processor.

8. The electronic apparatus according to claim 6, wherein the at least one second processor is further configured to delay, in response to the internal reset of the at least one second processor, an initialization setting of the predetermined input terminal for a predetermined waiting time starting from a start of initializing of the plurality of terminals.

9. The electronic apparatus according to claim 1, further comprising a third processor configured to:
perform an internal reset of the third processor in response to an occurrence of a malfunction of the third processor; and
output another internal-reset occurrence signal indicating that the internal reset has occurred, in response to the internal reset of the third processor, wherein
the first processor is further configured to:
detect an output of the another internal-reset occurrence signal from the third processor;
identify the at least one second processor as the source of the internal reset, in response to detection of the internal reset and input of the identification signal from the at least one second processor; and
identify the third processor as the source of the internal reset, in response to detection of the internal reset that is not accompanied by the input of the identification signal from the at least one second processor.

10. The electronic apparatus according to claim 1, wherein
the at least one second processor includes a plurality of second processors, and
the first processor identifies one of the plurality of second processors as the source of the internal reset, in response to the output of the internal-reset occurrence signal and an input of the identification signal from the one of the plurality of second processors.

11. The electronic apparatus according to claim 1, further comprising a connected device connected to the at least one second processor, the connected device including a third processor configured to:
perform an internal reset of the connected device; and
output another internal-reset occurrence signal indicating that the internal reset has occurred, in response to the internal reset of the connected device, wherein
the first processor is further configured to:
output a first identification signal in response to the internal reset of the at least one second processor;
output a second identification signal in response to the internal reset of the connected device;
detect an output of the another internal-reset occurrence signal from the connected device;
identify the at least one second processor as the source of the internal reset, in response to the detection of the internal reset and an input of the first identification signal from the at least one second processor; and
identify the connected device as the source of the internal reset, in response to the detection of the internal reset and an input of the second identification signal from the at least one second processor.

12. The electronic apparatus according to claim 1, wherein the electronic apparatus is an image forming apparatus.

13. A method performed by a processor of a plurality of processors in an electronic apparatus, the method comprising:
detecting an output of an internal-reset occurrence signal from at least one other processor of the plurality of processors, the internal-rest occurrence signal indicating that an internal reset has occurred; and
identifying, as a source of the internal reset, the at least one other processor in response to the output of the internal-reset occurrence signal and an input of an identification signal from the at least one other processor, wherein
the at least one other processor outputs, as the identification signal and in response to occurrence of the internal reset of the at least one other processor, a signal that indicates the source of the internal reset and that changes in value in response to the internal reset of the at least one other processor.

14. A non-transitory recording medium storing program codes which, when executed by a processor of a plurality of processors, cause the processor to execute a method, the method comprising:
detecting an output of an internal-reset occurrence signal from at least one other processor of the plurality of processors, the internal-rest occurrence signal indicating that an internal reset has occurred; and
identifying, as a source of the internal reset, the at least one other processor in response to the output of the internal-reset occurrence signal and an input of an identification signal from the at least one other processor, wherein
the at least one other processor outputs, as the identification signal and in response to occurrence of the internal reset of the at least one other processor, a signal that indicates the source of the internal reset and that changes in value in response to the internal reset of the at least one other processor.

* * * * *